United States Patent [19]

Weido et al.

[11] Patent Number: 4,515,010
[45] Date of Patent: May 7, 1985

[54] STUCK POINT INDICATING DEVICE WITH LINEAR SENSING MEANS

[75] Inventors: Vincent C. Weido; David Grissom, both of Houston, Tex.

[73] Assignee: NL Industries, Inc., New York, N.Y.

[21] Appl. No.: 478,980

[22] Filed: Mar. 25, 1983
(Under 37 CFR 1.47)

[51] Int. Cl.³ .......................... E21B 31/00; E21B 47/00
[52] U.S. Cl. .......................... 73/151; 166/66; 166/301; 166/255
[58] Field of Search .................... 73/151; 166/66, 255, 166/301, 206, 65 M

[56] References Cited

U.S. PATENT DOCUMENTS

| 3,004,427 | 10/1961 | Berry | 73/779 |
| 3,555,896 | 1/1971 | Roberts | 73/151 |
| 3,686,943 | 8/1972 | Smith | 73/151 |
| 3,942,373 | 3/1976 | Rogers | 166/255 |
| 4,351,186 | 9/1982 | Moulin | 73/151 |
| 4,402,219 | 9/1983 | Hache | 73/151 |

*Primary Examiner*—Howard A. Birmiel
*Attorney, Agent, or Firm*—Carl O. McClenny; William E. Johnson, Jr.

[57] ABSTRACT

A device for determining the stuck point of a drill pipe in a borehole consisting of two relatively movable sections, anchoring means for each section, a sensing means for detecting relative movement of the two sections and producing an inductance representative of the movement. The inductance is transformed into a frequency modulated signal which is transmitted to the surface and converted from a non-linear direct current voltage representation of relative movement to a linear direct current voltage.

10 Claims, 3 Drawing Figures

STUCK POINT INDICATING DEVICE WITH LINEAR SENSING MEANS

BACKGROUND OF THE INVENTION

The present invention relates to apparatus for determining the point or points at which drill pipe, casing or tubing is stuck in a borehole traversing earth formations. Primarily, this apparatus detects the stuck point above which the pipe may be removed.

The approximate location of the stuck point may be estimated from the surface by stretching the free pipe above the stuck point. Then, a stuck point indicating device is lowered into the pipe to locate the actual stuck point. The stuck point indicating device generally consists of a pair of spaced members connected by a sensing means that permits a limited amount of relative movement between the spaced members and produces a signal representing the relative movement between the members when the drill pipe is stretched from the surface.

In a stuck point measurement each spaced member is temporarily connected to the pipe and a force applied to the upper portion of the pipe. The force may be upward, downward or rotational. When, for example, a force in the form of torque is applied to the upper end of the pipe to twist the pipe, the length of the pipe above the stuck point will twist as indicated by relative movement between the spaced members whereas the pipe below the stuck point will not. The device is progressively lowered down through the pipe, applying a twist to the pipe after the device is positioned in the pipe until the device passes the stuck point, at which point no relative rotation of the individual spaced members will occur.

After the stuck point is located, the free pipe above the stuck point may be removed from the well by conventional methods.

PRIOR ART

U.S. Pat. No. 2,550,964 discloses a device for determining the point at which a pipe is stuck in a well which includes a pair of spaced expansible members. These members are connected by a sensing structure that permits relative movement of the expansible members which engage spaced portions of the pipe wall. Torque is applied to the upper end of the pipe to twist it and the expansible members of the device rotate relative to each other or remain stationary depending upon whether the torque applied to the upper end of the pipe has produced relative rotation of the portions of the pipe engaged by the expansible members. An electrical control means in the device is responsive to relative movement of the spaced members and is coupled with an indicator apparatus at the surface to provide a non linear signal indicating relative movement of the spaced members.

U.S. Pat. No. 3,004,427 discloses a stuck point indicating device utilizing variable inductance to measure relative movement between two anchored sections of the device. Before a stuck point measurement is made, the individual elements of the variable inductance must be placed in an initial position relative to each other. A direct current is applied to the individual elements of the variable inductance to create a magnetic attraction between the elements and they are drawn to the required initial position. This step is necessary since the inductance signal will be non-linear, with the greatest deflection occurring at initial parting movement of the sections.

U.S. Pat. No. 3,762,218 discloses a movable spiral wedge shaped element for generation of a gap upon twisting of the pipe to produce a variable inductance which is measured as being substantially linear. The wedge shaped spiral element changes position with twist of the pipe to produce an air gap and is disclosed to eliminate the necessity of setting the sensing means at an initial position.

SUMMARY OF THE INVENTION

The present invention provides a device that may be lowered into a pipe at the end of a cable to locate the point at which the pipe is stuck in a well by providing an indication of relative movement between a pair of spaced members. The device has an upper member and a lower member connected by means for providing an indication of relative movement between the upper and lower members. Individual anchor means that contact the wall of the pipe are carried by the upper and lower members. The upper and lower members are rotatably and axially movable relative to each other. A sensor provides a variable inductance representative of the relative movement between the upper and lower members.

The change in inductance is converted to a frequency modulated signal transmitted to the earth's surface, where the signal is transformed from a non linear current or voltage into a linear current or voltage which is compared or displayed to indicate the relative movement between the upper and lower members.

It is therefore an object of the present invention to provide a stuck point indicating device that will provide a linear indication of relative movement of the individual spaced members.

It is a further objective of the present invention to minimize the required manual set-up of surface equipment and to transmit stuck point data in a manner free from the adverse electrical properties of the cable.

The above and other objects of the present invention will become apparent from a consideration of the following detailed description of the invention when taken in conjunction with the accompanying drawings.

DETAILED DESCRIPTION OF THE INVENTION

Figure 1:
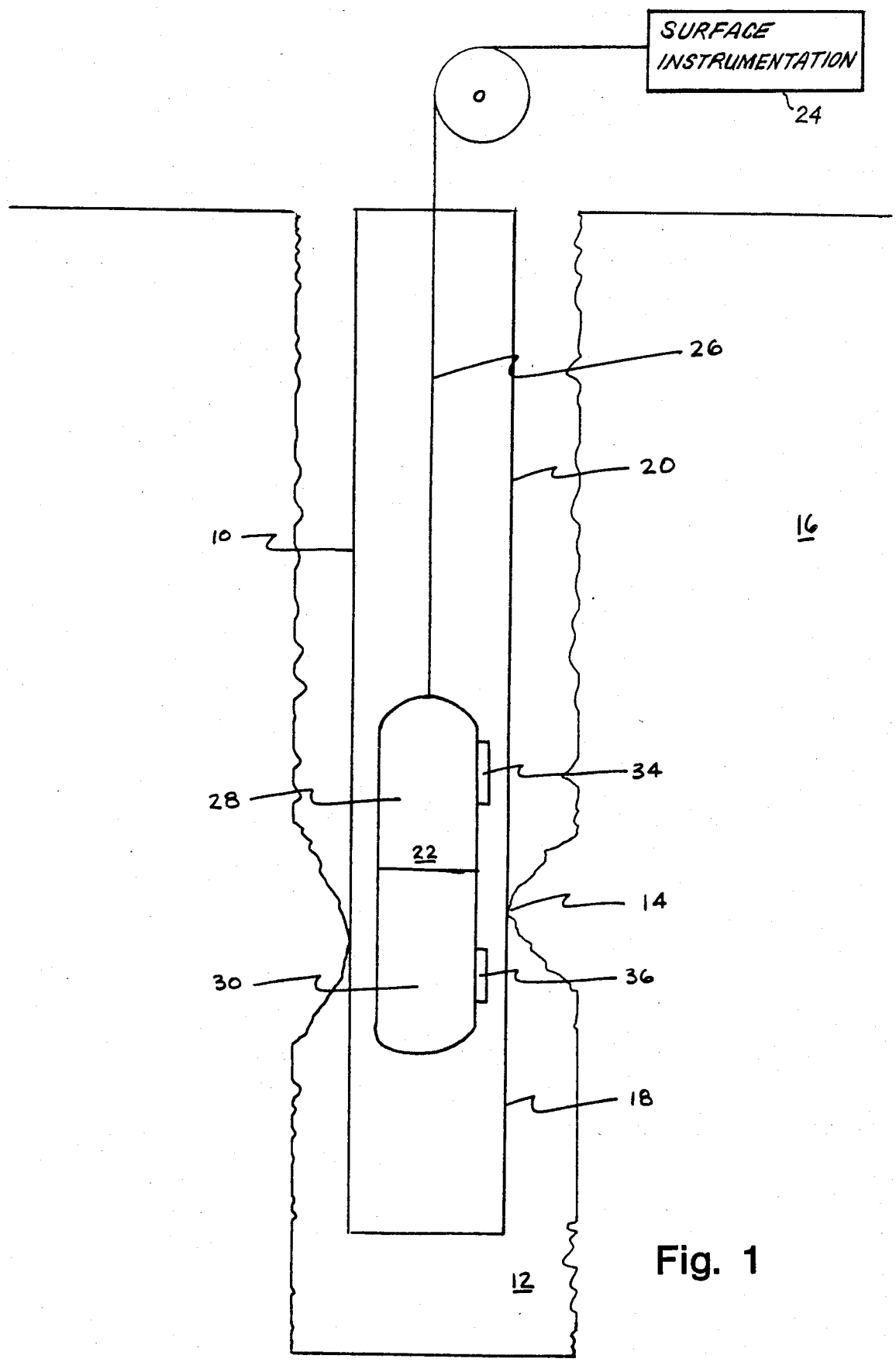
FIG. 1 is a fragmentary sectional view showing a portion of a pipe which is stuck in a well with the preferred embodiment of the present invention positioned in the pipe for taking a stuck point measurement.

Referring now to FIG. 1, a portion of a pipe 10, such as a string of drill pipe, is shown extending into a well bore 12. This pipe 10 is stuck at a point 14 wherein a portion of the earth formation 16 surrounding the pipe 10 has closed in around the portion of the pipe 10 below the point 14. The lower portion 18 of the pipe 10 below the stuck point 14 may be referred to as the stuck portion of the pipe whereas the upper portion 20 of the pipe 10 constitutes the free portion. When the pipe 10 is standing in the borehole without any force or pull exerted on its upper end, much of the upper portion 20 will be under compression due to the weight of the pipe extending upwardly from stuck point 14. This compression gradually diminishes toward the upper end of the free portion 20. If an upward force is applied to the upper end of the pipe 10, the free portion 20 will be elongated and this elongation will be substantially equal per unit length throughout the entire length of the free portion 20 of the pipe. It will also be understood that a torque or twist applied to the upper end of the pipe 10 will produce a twisting stress throughout the length of the upper portion 20 of the pipe 10 but no stress in the lower portion 18 below the stuck point 14.

A stuck point indicating device generally designated as 22 is connected to surface instrumentation 24 by a cable 26. The device 22 consists of an upper section 28 and a lower section 30 connected to the upper means in a manner that permits relative rotation and a limited amount of relative axial movement between the two sections and sensing means 32 (FIG. 2) connected to both the upper and lower sections 28 and 30 respectively for detecting relative position between the upper and lower sections. An upper anchor assembly 34 is positioned on the upper section 28 and a lower anchor assembly 36 is positioned on the lower section 30.

Figure 2:
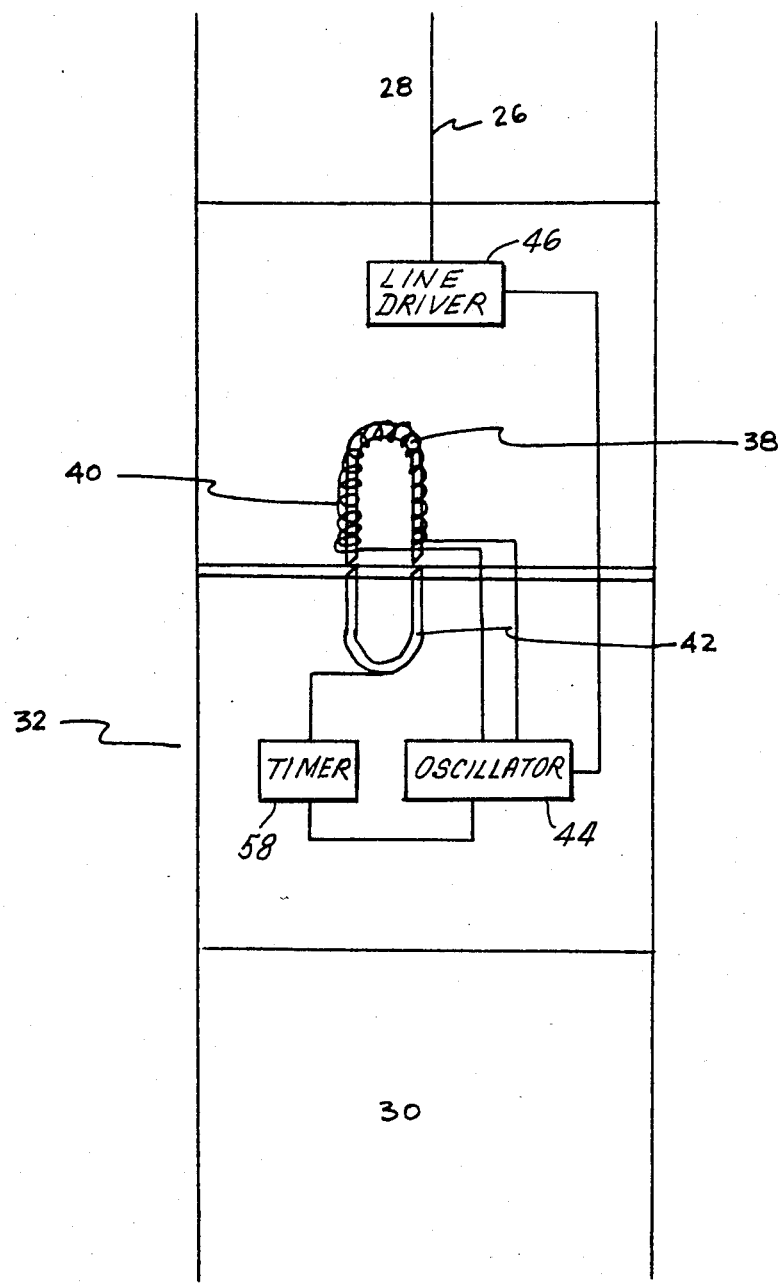
FIG. 2 is a schematic representation of the sensing means of the preferred embodiment device showing the means for sensing relative movement of the upper and lower sections.

Referring now to FIG. 2, the sensing means 32 is a variable inductance circuit consisting of an upper U-shaped permeable core 38 on which coils of wire 40 are wound, and a lower mating U-shaped permeable core 42. The upper core 38 is mechanically connected to the upper section 28 and the lower core 42 is connected to the lower section 30. A controlled amount of rotational freedom of the lower core is permitted. The mating faces of the upper and lower cores are formed along an angle which provides for a nearly equal change in inductance when upper and lower sections are stretched apart and when the upper and lower sections are rotated relative to each other.

The sensing means 32 in the preferred embodiment is shown as a variable inductor in parallel with a resistor. The sensing means is connected to an oscillator circuit 44 which generates an output frequency directly related to the change in inductance caused by the parting movement of the upper and lower members which creates an air gap between the cores. The output frequency signal is conducted from the oscillator 44, to a line driver 46 which transmits the frequency modulated signal on the cable 26.

Figure 3:
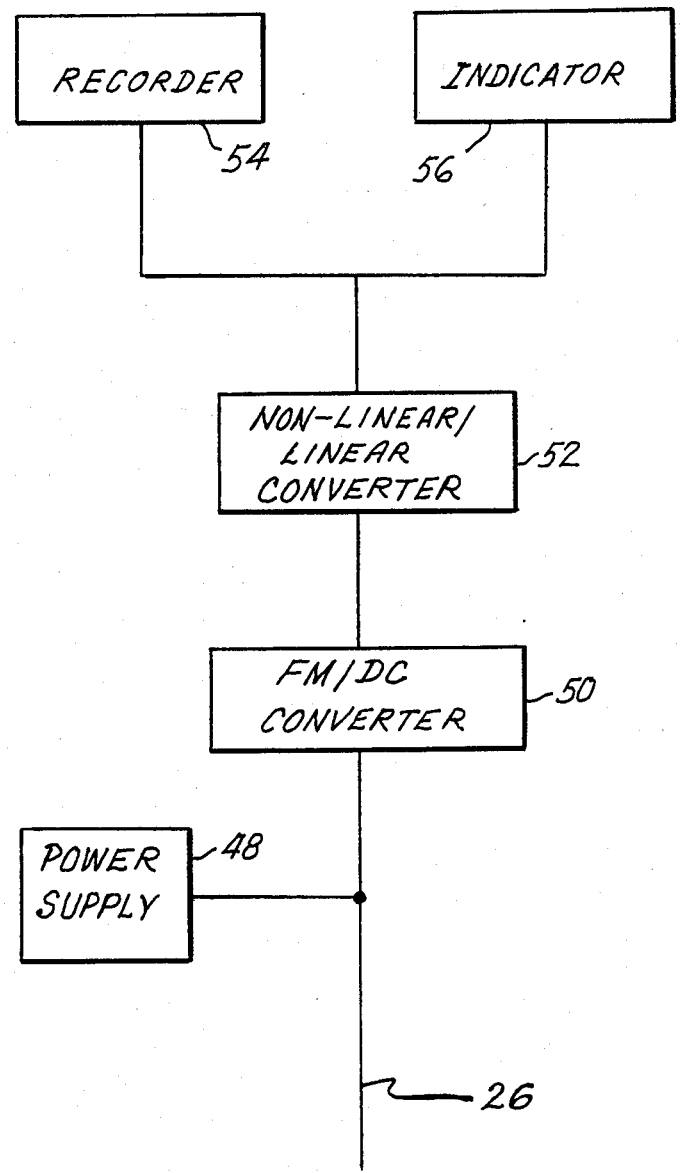
FIG. 3 is a schematic representation of the surface instrumentation incorporating a portion of the preferred embodiment of the present invention.

Referring to FIGS. 1 and 3, the anchoring assemblies 34 and 36 are preferably electromagnetic which may be energized by a power supply 48. The power supply 48 also provides power for downhole electronics shown in FIG. 2. The wireline cable 26 connects to the line driver 46 and to a means 50 for converting the frequency modulated signal to a non-linear DC voltage. This non-linear DC voltage is conducted to a non-linear-to-linear means 52 which converts the non-linear voltage to a linear voltage. This means 52 is preferably an antilog amplifier. The output of 52 may be transmitted to a recording means 54 and/or indicating instrumentation 56.

In the operation of the present invention, the stuck point indicating device 22 is lowered into the pipe 10 by cable 26 to a targeted depth relative to the pipe 10. The placement with regard to the estimated depth may be accomplished by a counting collar not shown. Known techniques are used based on certain surface measurements to predict the estimated depth.

When positioned at the targeted depth, the electromagnets 34 and 36 are energized by power supply 48 to anchor to the pipe 10 the upper and lower sections 28 and 30 of the device 22. A short time thereafter, a timing control means 58, shown in FIG. 2, forces the lower core 42 in relation to upper core 38 to an initialized maximum inductance position for which the measurement for inductance is "zeroed".

The upper end 20 of the pipe 10 is stressed either by tension or by torque being applied. Since the upper portion 28 of the device 22 is firmly connected to one section of the pipe 10 by anchor assembly 34 and the lower section 30 is connected to another portion of the pipe 10 by anchor assembly 36, the stuck point 14 can be detected by noting whether the stress applied to the upper end 20 of the pipe 10 has caused sufficient relative movement between the upper section 28 and lower section 30 of the stuck point indicating device 22.

The stress imparted to the pipe 10 from the surface by rotating and/or lifting upwardly causes an incremental change at the targeted depth. The degree of change or movement, if any, of the respective points of attachment of the device 22 will be slightly different for the lower section 28 relative to upper section 30. Accordingly, the sensing means 32 will indicate relative movement between upper and lower cores 38 and 42 respectively. A change in inductance produces a change in the frequency generated by oscillator 44 which is transmitted up the wireline by line driver 46. At the surface, the change in frequency is converted to a DC voltage and linearized by an antilog amplifier means 52. This transformation is accomplished by taking the antilog of the non linear voltage, thus producing a substantially linear response which is useful in its entirety, thereby providing for consistent interpretation of relative movement and such interpretation can be conveniently related to exact movement of upper end 20. This provides a quantitative measurement of stuck-point. The results are shown on recording and indicating instrumentation 54 and 56.

Any movement of the movable core 42 will cause a variation in inductance caused by the changed electrical characteristic and relative movement of the sections 28 and 30. Initialization is necessary and after the electromagnetic anchors are positioned, a timing/control circuit 58 provides for delayed sequencing of the electromechanical initialization network not shown which forces the lower core 42 to the closed position maximum inductance with the upper core 38. This step eliminates the possibility of inadvertent twisting of lower section 30 relative to upper section 28 at the time electromagnetic anchors 34 and 36 are energized and settling onto the pipe wall. Any relative axial movement of the sections 28 and 30 will cause a change in position of lower core 42 thereby changing the electrical characteristics of the sensing means 32. After the measurement has been made, the electromagnetic anchors 34 and 36 are deenergized and the device 22 is moved to a different position for another measurement.

An automatic technique is used to initialize the sensor. The combination of automatic initialization, frequency modulation techniques, and linearized data allows for the quantitative interpretation of pipe movement.

Various other alternatives in the details of construction and the sequence of transformations can be made without departing from the scope of the invention, which is indicated in the appended claims.

What is claimed is:

1. A downhole apparatus for determining the point at which a pipe is stuck in a well comprising:
 an upper body:
  means for anchoring said upper body to said pipe;
 a lower body:
  means for anchoring said lower body to said pipe;
  means for connecting said upper and lower bodies, said connecting means being adapted to allow relative axial and rotational movement between said upper body and said lower body;
  inductance means located in each of said upper and lower bodies and adapted to sense relative movement between said upper and lower bodies;
  oscillator means located in one of said bodies and wherein said inductance means is included in the tank circuit of said oscillator means for generating a frequency modulated signal in relation to changes in said inductance means;
  first converter means for converting said frequency modulated signal to a non-linear dc voltage;
  second converter means for generating a substantially linear voltage in relation to said non-linear voltage;
 and
  surface instrumentation means for displaying said linear voltage.

2. The apparatus of claim 1 wherein said upper and lower anchor means are electromagnetic.

3. The apparatus of claim 2 wherein said inductance means includes a fixed portion connected to one of said bodies and a movable portion connected to the other of said bodies.

4. The apparatus of claim 3 wherein said inductance means includes a means for biasing said movable portion to contact said fixed portion.

5. The apparatus of claim 4 wherein said biasing means is a pulsed electromagnetic force.

6. The apparatus of claim 5 wherein said biasing means includes additionally a means for biasing said movable portion after a short predetermined period of time after said upper and lower anchor means are actuated.

7. A method of determining the point at which a pipe is stuck in a borehole traversing an earth formation comprising:
 positioning a movement-sensing means in said pipe at two vertically spaced points at the depth to be tested; subjecting said pipe above said sensing means to a change in stress capable of deforming the pipe between said spaced points, said change in stress being indicated by a change in inductance indicative of said deformation; converting said change in inductance into a frequency modulated signal; converting said frequency modulated signal into a substantially linear voltage capable of quantitative display wherein said display is indicative of deformation between said points in response to said change in stress; and, displaying said linear voltage on the earth's surface.

8. The method of claim 7 wherein said stress is caused by rotation.

9. The method of claim 7 further including the additional step of electromagnetically anchoring said movement-sensing means to said pipe prior to inducing said change in stress.

10. The method of claim 9 further including the steps of maximizing the inductance produced by said inductance producing means and delaying the commencement of said maximizing step for a preselected period of time.

* * * * *